United States Patent [19]

Sorgatz et al.

[11] 4,004,662
[45] Jan. 25, 1977

[54] SHOCK ABSORBER WITH DIFFERENT DAMPING EFFECTS AT DIFFERENT PARTS OF STROKE

[75] Inventors: Ulrich Sorgatz; Fritz Ammesdörfer, both of Wolfsburg, Germany

[73] Assignee: Volkswagenwerk Aktiengesellschaft, Wolfsburg, Germany

[22] Filed: Sept. 17, 1975

[21] Appl. No.: 614,147

Related U.S. Application Data

[63] Continuation of Ser. No. 510,885, Oct. 1, 1974, abandoned.

[30] Foreign Application Priority Data

Oct. 16, 1973   Germany ........................... 2351813

[52] U.S. Cl. ............................... 188/284; 188/282
[51] Int. Cl.² ............................................ F16F 9/49
[58] Field of Search .......... 188/281, 282, 284, 285, 188/286, 287, 288, 289, 317, 320, 316

[56] References Cited

UNITED STATES PATENTS 2,316,924   4/1943   Whisler, Jr. ..................... 188/317

FOREIGN PATENTS OR APPLICATIONS

| 537,375 | 2/1957 | Canada | 188/317 |
| 969,377 | 5/1958 | Germany | 188/288 |
| 1,430,494 | 4/1970 | Germany | 188/284 |
| 47,489 | 5/1962 | Poland | 188/317 |

Primary Examiner—George E. A. Halvosa
Attorney, Agent, or Firm—Brumbaugh, Graves, Donohue & Raymond

[57] ABSTRACT

A hydraulic shock absorber for use in a motor vehicle suspension system to reduce dynamic tilting of the vehicle. The shock absorber is of the conventional type having a cylinder, a piston arranged to move within the cylinder between two end stops, and a pressure medium arranged within the cylinder to damp the movement of the piston. A device is provided, according to the invention, for increasing the damping of the piston motion directed away from a particular end stop only after the piston has approached closer to that end stop than is usual during normal operation of the vehicle. The particular end stop, in this case, is the one near which the piston will be located when the associated motor vehicle wheel is unloaded.

2 Claims, 5 Drawing Figures

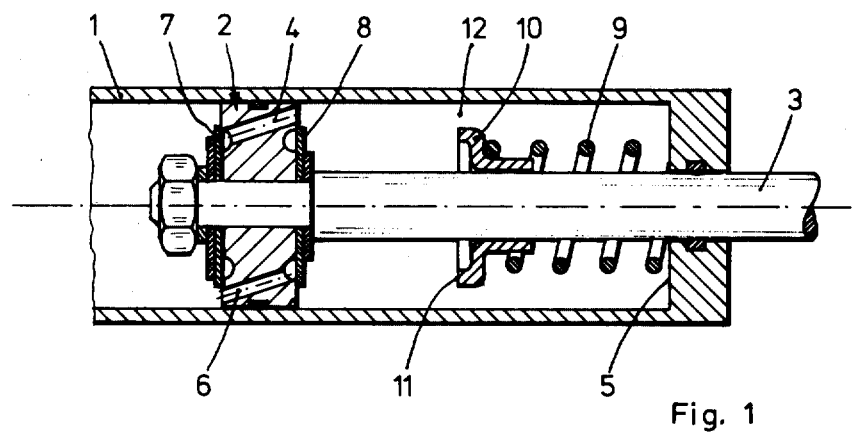
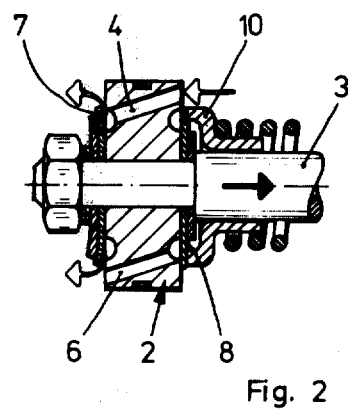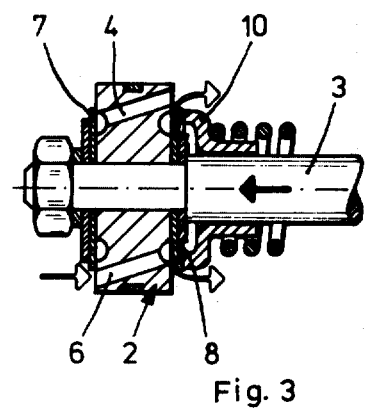
Fig. 1
Fig. 2  Fig. 3

SHOCK ABSORBER WITH DIFFERENT DAMPING EFFECTS AT DIFFERENT PARTS OF STROKE

This is a continuation, of application Ser. No. 510,885 filed Oct. 1, 1974, now abandoned.

BACKGROUND OF THE INVENTION

The present invention relates to hydraulic shock absorbers for use in the suspension systems associated with motor vehicle wheels. More particularly, the invention relates to vehicle shock absorbers of the type comprising a piston arranged within a cylinder containing a pressure medium and having two end stops for the piston.

Motor vehicle shock absorbers of the above-described type conventionally have a single damping characteristic when the piston is moved from stop to stop in either direction. As will be explained in greater detail hereinbelow, certain known shock absorbers have also been constructed to provide a varied damping characteristic depending upon the position of the piston within the cylinder.

The chief purpose of such known shock absorbers is to increase both the safety and comfort in the operation of a motor vehicle. However, there is one dynamic characteristic of a motor vehicle which known shock absorbers have been unable to effectively control; namely, the tendency of a motor vehicle to tilt excessively (and dangerously) during certain steering maneuvers and braking operations.

SUMMARY OF THE INVENTION

It is an object of the present invention to provide a shock absorber, for use in the suspension system associated with a motor vehicle wheel, which is capable of reducing the dynamic tilting tendency of the vehicle.

This object, as well as other objects which will become apparent in the discussion that follows, is achieved, according to the present invention, by the introduction of a device or means, in the region of at least that one of the end stops near which the piston will be located when the motor vehicle wheel is unloaded, for increasing the damping of the piston motion directed away from this particular stop only after the piston has approached closer to the stop than is usual during normal operation of the vehicle.

As has been discovered by extensive theoretical research and experimentation, an essential cause of dynamic tilting in a motor vehicle, resulting in possible rollover, is a typically large increment or change in the load on the wheels that are on the inside of a curve; i.e., the relieved wheels. The invention diminishes this abrupt load increment by reducing the wheel load peak through a suitable design of the shock absorbers of the vehicle. It is true that the wheels on the outside of a curve - that is, the loaded wheels - have a considerably higher level of vertical and lateral forces applied to them; but it has been found that only a change in the wheel load (and, hence, in the wheel load increment) on the inside wheels which have a smaller load will produce a correspondingly large change in the lateral forces.

This theoretical and experimental discovery is utilized in the present invention in that, in the region of at least that one of the end stops of the shock absorber in whose proximity the piston in question is located when the wheel is unloaded, means are provided that operate in cooperation with the piston to increase the damping of the piston motion when the piston is in a certain position or range of positions. In negotiating a curve, for example, these means will act on the inside wheel, so that the resulting reduction in wheel load increment will also manifest itself sharply with respect to the lateral forces.

It should be noted that the above-described arrangement, according to the present invention, does not preclude providing an additional damping means in the region of the other stop of the shock absorber in the proximity of which the piston is located when the wheel is loaded.

An essential feature of the present invention is that the additional damping which is introduced acts in one direction only; namely, upon piston motions directed away from the stop, while motions of the piston toward the stop are not affected. This ensures that, without increasing the structural length of the shock absorber, in rapid dynamic processes there will be no reduction in the effectively useful spring travel. Furthermore, the damping produced by the means according to the invention in cooperation with the piston is designed so as not to impair the desired riding comfort during normal operation of the vehicle. For this reason, the means are so arranged with respect to the piston that the additional damping is not introduced until the piston is located near the stop in question. That is, the means according to the invention will produce no additional damping, whether the vehicle be fully loaded or empty, within the range of normal piston travel of the shock absorber but will be operable only during critical maneuvers of the vehicle.

In practicing the invention, it is possible to employ various designs and constructions which are per se well known in the art. Thus, in one embodiment of the invention the piston exhibits first passages for the flow of pressure medium during motions of the piston toward the stop and second passages for the flow of pressure medium during piston motions away from the stop, and the means comprise a rest element which is spring-supported in the region of the stop and ensures at least a partial obstruction of the second passages after approach of the piston.

Specifically, at least one flat spring may be arranged on the side of the piston which faces the stop in such a way that it is lifted off by the flow of pressure medium, from a position at least partially obstructing the second passages, during piston motions directed away from the stop. In this case, the rest element may be arranged to rest against the flat spring when the piston approaches the stop to increase the force of the flat spring for a certain range of piston travel away from the stop.

Shock absorber designs of above-described type are generally known although these prior art designs operate in a different manner to achieve a different purpose. In particular, the West German Utility Model Pat. No. 1,864,225 describes an arrangement of this type, but with a rest element of such construction that additional damping of piston motions is introduced in both directions of piston travel by the cooperation of the rest element and the piston. The West German Patent Publication DAS No. 1,176,498 discloses a shock absorber which is so constructed that additional damping through cooperation of the piston and a rest element occurs during piston motions in one direction only; however, in this case, the increased damping occurs during motions of the piston toward the stop. As noted above, it is an essential feature of the present invention that the increased damping is obtained only during motions of the piston away from a particular stop.

Another embodiment of the present invention provides that the piston, on the side towards the stop, and the means according to the invention, which is supported against the stop, each incorporate a hollow cylinder, one of which at least partially surrounds the other as the piston approaches the stop. A gap is provided between the two cylinders communicating, on one hand, with an annular chamber in the piston bounded by one face of the hollow cylinder of the inventive means and, on the other, with the interior space enclosed by the two hollow cylinders into which open passages in the piston for the flow of fluid during motions of the piston. During piston motions toward the stop only, the annular chamber communicates with the interior space by way of a one-way valve which opens and short-circuits the gap. It is possible to vary the width of the gap, in the direction of the axis of the shock absorber, in order to vary the additional damping in dependence upon the peak wheel load at the time.

Although it is known, from the published specification of the West German Patent Application P 33,869 d/63c/42, that a by-pass groove may be provided in a telescoping vibration damper in the wall of the damping cylinder for the fluid to be displaced by the piston, which groove may also have a stage-wise or continuously varying cross-section, this reference discloses neither the special arrangement of the present means to increase the damping nor the provision of such means which act only during piston motion in a particular direction; namely, away from a particular stop.

Proceeding from the discovery that the danger of rollover arises only upon the simultaneous occurrence of very definite steering, speed, and braking conditions, the present invention makes it possible to reduce the tilting tendency of a motor vehicle while requiring no change in its principal dimensions, such as its track width or the position of its center of gravity. Rather, the present invention is limited to a modification of the already existing elements of a vehicle - i.e., the shock absorbers - which may even be subsequently installed or retrofitted on the vehicle after manufacture.

BRIEF DESCRIPTION OF THE DRAWINGS

FIG. 1 is a cross-sectional view of a portion of a shock absorber constructed according to a first embodiment of the present invention.

FIGS. 2 and 3 are cross-sectional views of a portion of the shock absorber of FIG. 1, illustrating the flow of pressure medium during operation.

DESCRIPTION OF THE PREFERRED EMBODIMENTS

Figure 4:
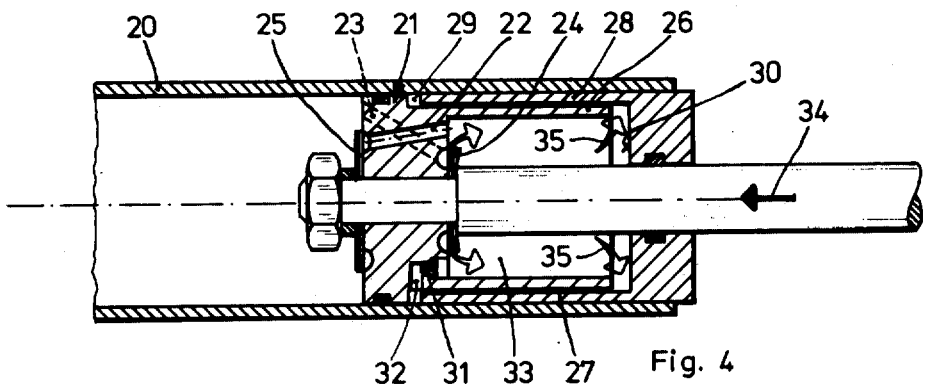
FIG. 4 is a cross-sectional view of a portion of a shock absorber constructed according to a second preferred embodiment of the present invention.

Considering first the shock absorber represented in FIG. 1, it consists, in a known manner, of a piston 2 arranged to travel within a cylinder 1. The piston has a piston rod 3 extending outward through an end stop 5 on the cylinder. The motor vehicle wheel may be articulated, for example, to the piston rod 3, while the cylinder 1 is connected to the vehicle chassis. These details are known and are therefore not represented in the drawing.

Considering the piston 2 in detail as represented also in FIGS. 2 and 3, the piston body contains first flow passages 4 for the flow of pressure medium (fluid) during motions of piston toward the end stop 5; i.e., the stop in whose proximity the piston is located when the motor vehicle wheel is not loaded. Further, the piston 2 contains second passages 6 that act to permit the flow of fluid during motions of the piston away from the stop 5. As a rule, the piston 2 will have a plurality of first and second passages distributed around its piston rod 3.

As the figures also show, the piston 2 has spring valves 7 and 8 formed by flat spring discs at the piston faces. The valve 7 covers the first passages 4 and the valve 8 the second passages 6 during those motions of piston in which the corresponding passages 4 and 6, respectively, are to be closed. In a motion of piston 2 toward the stop 5, the spring discs forming the valve 7, as shown in FIG. 2, lift off from the ends of the first passages 4 associated therewith, so that flow through these passages is possible. Conversely, however, the pressure and flow of the pressure medium during the motion of the piston toward stop 5 presses the spring discs forming the valve 8 still tighter against the outlet ends of the passages 6 associated therewith so that these second passages are closed.

Now, as a result of a critical maneuver of the motor vehicle, if the wheel connected to the piston rod 3 is relieved so much that the piston 2 comes to rest on a rest element 10, which as shown in FIG. 1 is supported with respect to the stop 5 by a coil spring 9, the annular portion 11 of the rest element rests against the valve 8, so that the spring 9 likewise increases the force of the spring discs forming the valve 8. This condition is represented in FIG. 2.

The additional spring force imparted to the valve 8 becomes greater, the closer the piston 2 approaches the stop 5. The distance of the ring 11 from the stop 5 is so chosen that this cooperation between the parts 2 and 11 occurs only under extraordinary driving conditions.

An important point to note is that, by suitably conforming the rest element 10 to provide a free space 12, the rest element will have no influence upon the flow of pressure medium through the first passages 4. This means that the flow through these passages remains unaffected during the motion of the piston toward the end stop 5 even though the piston 2 may have come to rest on the annular portion 11. This operation of the shock absorber is illustrated in FIG. 2.

On the other hand, the additional damping occurs in full measure as soon as the piston 2 begins to return from its extreme position, in which it is in contact with the rest element 10, away from the stop 5. Since the annular portion 11, as explained, has come to rest on the valve 8, at least during the first phase of this motion away from stop 5 it increases the spring force of the valve 8 obstructing the second passages 6, so that the resistance to fluid flow through the passages 6 is substantially increased. This increase of damping does not become inoperative until piston 2 moves away from the rest element 10 and the spring discs forming the valve 8 are able to bend up under the action of the flow through the passages 6, as may be seen in FIG. 3.

In the embodiment of FIG. 4, the piston traveling in the cylinder 20 is again provided with first passages 22 and second passages 23 for the flow of fluid. These passages are associated with valves formed by spring discs 24 and 25, respectively, on the faces of the piston. The piston 21 has a hollow cylindrical extension 26 which is concentrically surrounded by a hollow cylinder 28 fixedly attached to the cylinder 20. The inside surface of the cylinder 28 is of slightly greater diameter than the outside surface of the cylindrical extension 26, thus forming a gap 27 between the two members.

As may be seen an annular space or chamber 29 is formed in the cylinder 20 between the piston 21 and the face of the cylinder 28 as soon as the piston has executed a sufficiently large motion toward the stop 30. In the further course of motion of the piston toward the stop, this annular chamber 29 becomes smaller and smaller, and the fluid forced out of it enters the interior space of the two hollow cylinders 26 and 28 via a one-way valve 31 in a passage 32. When the piston 21 moves away from the stop 30, in the direction of the arrow 34, the one-way valve 31 is closed, and the fluid flowing in through the second passages 23 can pass from the interior space 33 into the annular chamber 29 only through the gap 27, as indicated by the open arrows 35. Since the gap 27 represents a considerable resistance to fluid flow, during that phase of motion of the piston 21 in which the hollow cylinders 26 and 28 surround one another at least in part, there will be a substantial increase in damping of the piston motion. Again, it is important to note that this increase in damping occurs only during motions of the piston in one direction; namely, away from the stop 30, and that, moreover, this increase does not take place during the comparatively small piston motions which occur in normal operation of the vehicle.

Figure 5:
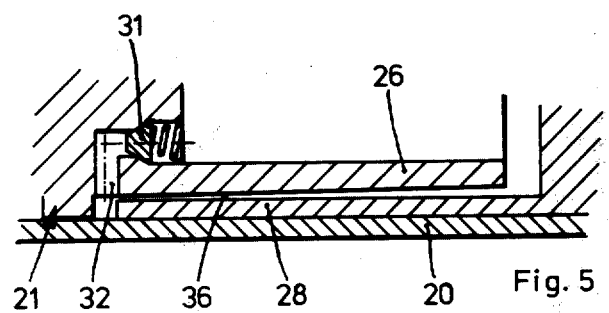
FIG. 5 is a cross-sectional view of a portion of a shock absorber, illustrating a modification of the shock absorber of FIG. 4.

As FIG. 5 shows, by non-parallelism of the facing peripheral surfaces of the two hollow cylinders, designated 26 and 28 as before, it is possible to vary the width of the gap 36 to obtain a certain distribution of the additional damping as a function of the position of the piston 21.

The embodiment described above with reference to FIGS. 4 and 5 offers the advantage of particularly effective heat dissipation.

Just as in the embodiment of the invention illustrated in FIGS. 4 and 5 the hollow cylinders 26 and 28 form a constriction to the flow of fluid, so also in the embodiment of FIGS. 1 to 3 the rest element 10 may be constructed to increase the damping by deflecting the flow rather than by increasing the spring force of spring discs 8. Thus, in accordance with the present invention, various techniques may be employed for obstructing the flow of fluid in the second passages of the shock absorber piston.

Although the present invention has been described with reference to specific embodiments thereof, many modifications and variations of such embodiments may be made by those skilled in the art without departing from the inventive concept disclosed. Accordingly, all such modifications and variations are intended to be included with the spirit and scope of the appended claims.

We claim:

1. In a hydraulic shock absorber for use in the suspension system associated with a motor vehicle wheel so as to reduce the dynamic tilting tendency of the motor vehicle, said shock absorber having a cylinder, a piston arranged to move within the cylinder in directions of compression and extension between two end stops, and a pressure medium arranged within the cylinder to hydraulically damp the movement of the piston, said hydraulic damping having an effective level of normal damping during piston motions which occur during normal operation of the vehicle, the improvement wherein the piston includes first passages for the flow of pressure medium during piston motions toward that one of the end stops in the proximity of which the piston will be located when moved in the direction of extension, and second passages for the flow of pressure medium during piston motions away from said one stop; wherein the piston includes at least one flat spring on the side thereof facing said one stop, said flat spring being arranged to be lifted by the flow of pressure medium from a position at least partially obstructing only the second passages during piston motions directed away from said one stop; and wherein said shock absorber further comprises rest element means, disposed in the region of said one stop and spring supported in the direction towards said one stop so as to rest against said flat spring only when the piston is in said region, for providing at least a partial obstruction of said second passages and thus abruptly increasing the hydraulic damping, to a level substantially above said normal damping, of only the piston motion directed away from said one stop only after the piston has approached closer to said one stop than is usual during normal operation of the vehicle.

2. In a hydraulic shock absorber for use in the suspension system associated with a motor vehicle wheel and having a cylinder, a piston arranged to move within the cylinder in directions of compression and extension between two end stops, and a pressure medium arranged within the cylinder to hydraulically damp the movement of the piston, said hydraulic damping having an effective level of normal damping during piston motions which occur during normal operation of the vehicle, the improvement comprising means, disposed in the region of at least that one of the end stops in the proximity of which the piston will be located when moved in the direction of extension, for increasing the hydraulic damping, to a level above said normal damping, of only the piston motion directed away from said one stop only after the piston has approached closer to said one stop than is usual during normal operation of the vehicle, and wherein the piston, on its side facing said one stop, and said means, which is supported with respect to said one stop, each include a hollow cylinder, one of which at least partially surrounds the other when the piston is in said region of said one stop, forming a gap therebetween, said gap communicating on one hand with an annular chamber in the piston bounded by one face of the hollow cylinder of said means, and on the other with the interior space enclosed by the two hollow cylinders, into which space open passages in the piston for flow of pressure medium during motions of the piston; and wherein said annular chamber communicates with said interior space during piston motions directed toward said one stop by a one-way valve, said valve then opening and short circuiting said gap, whereby the dynamic tilting tendency of the motor vehicle may be reduced by said shock absorber.

* * * * *